Aug. 29, 1950  J. E. BOOP  2,520,622
CORN PICKER MOUNTING FRAME
Filed Sept. 9, 1948  3 Sheets-Sheet 1

Joe E. Boop
INVENTOR.

Aug. 29, 1950     J. E. BOOP     2,520,622
CORN PICKER MOUNTING FRAME

Filed Sept. 9, 1948     3 Sheets-Sheet 2

Joe E. Boop
INVENTOR.

BY *Clarence A. O'Brien*
*and Harvey B. Jacobson*
Attorneys

Aug. 29, 1950  J. E. BOOP  2,520,622
CORN PICKER MOUNTING FRAME
Filed Sept. 9, 1948  3 Sheets-Sheet 3

Inventor
Joe E. Boop

By Clarence A. O'Brien
and Harvey B. Jacobson
Attorneys

Patented Aug. 29, 1950

2,520,622

UNITED STATES PATENT OFFICE 2,520,622

CORN PICKER MOUNTING FRAME

Joe E. Boop, McCordsville, Ind.

Application September 9, 1948, Serial No. 48,370

2 Claims. (Cl. 56—15)

This invention relates generally to corn pickers and more particularly to structure for mounting a corn picker on a tractor.

In brief, this invention comprises an open rectangular frame pivoted on the rear axle housings and extending rearwardly of the tractor and forwardly of the rear axle to an intermediate point underneath the tractor.

The invention includes novel means for raising and lowering the front end portion of this frame, and a sub-frame on the rear end portion of the frame adapted to support a husking unit and an elevator to carry the husked corn rearwardly and outwardly into a wagon drawn behind the tractor. The sub-frame also includes means for mounting a flexible power transmission means for driving connection of a power plant in the tractor with the corn picker, and this sub-frame also includes a drawbar to which the said wagon can be secured.

A primary object of this invention is to provide mounting means for a corn picker which can be secured to a tractor, allowing the corn picker to be tilted and allowing the wagon into which the husked corn is to be placed to be drawn substantially directly behind the tractor, thus obviating the necessity of providing separate locomotive means for the wagon, without sacrificing any advantageous operational characteristics of the corn picker.

Still another object of this invention is to provide a device of the above mentioned character which is specially designed for use with a tractor having a vertical flange and a step on each side thereof for connection with a specially designed bracket, but which may be adapted easily for use with other tractors of slightly different design.

Still another object of this invention is to provide a device of the character mentioned above in which the ease of manually adjusting the corn picker is facilitated by the incorporation of a counter-balancing spring and a novel and very efficient adjusting means for the front end portion of the frame.

Still another object of this invention is to provide a device of this character in which a sub-frame is provided with flexible drive means and a drawbar which shift with the rear portion of the frame in a manner which will not prevent the independent adjustment of the elevator which is used to transfer the husked corn from the husking unit to the wagon.

And a last object to be mentioned specifically is to provide a corn picker mounting which is relatively inexpensive and practicable to manufacture, which is simple, safe and convenient to use, and which will give generally efficient and durable service.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Similar characters of reference designated similar or identical elements and portions throughout the specification and throughout the different views in the drawings.

Figure 1:
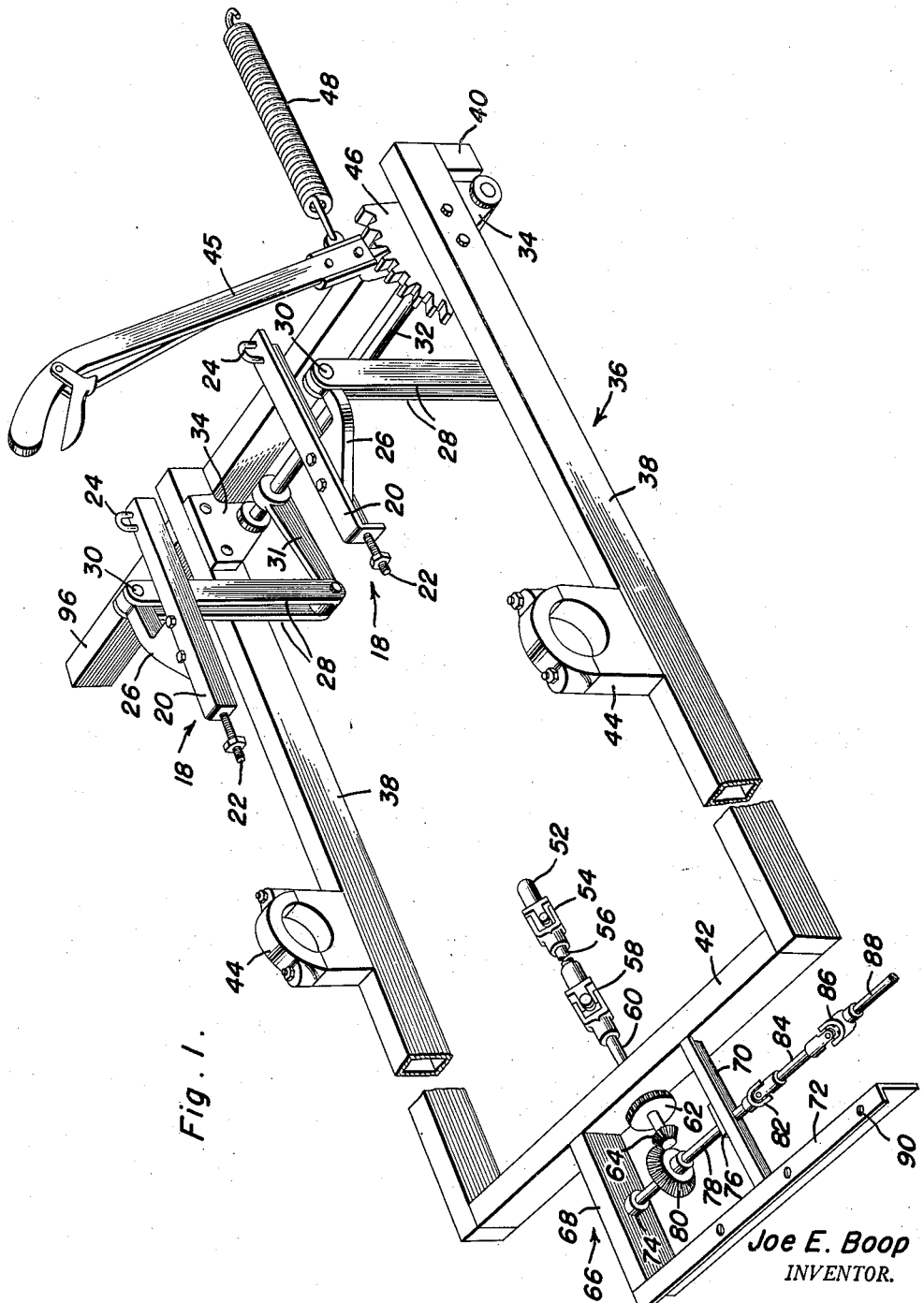
Figure 1 is a three-dimensional view of the frame and the parts connected thereon, which together form the principal elements in this invention.
Figure 2:
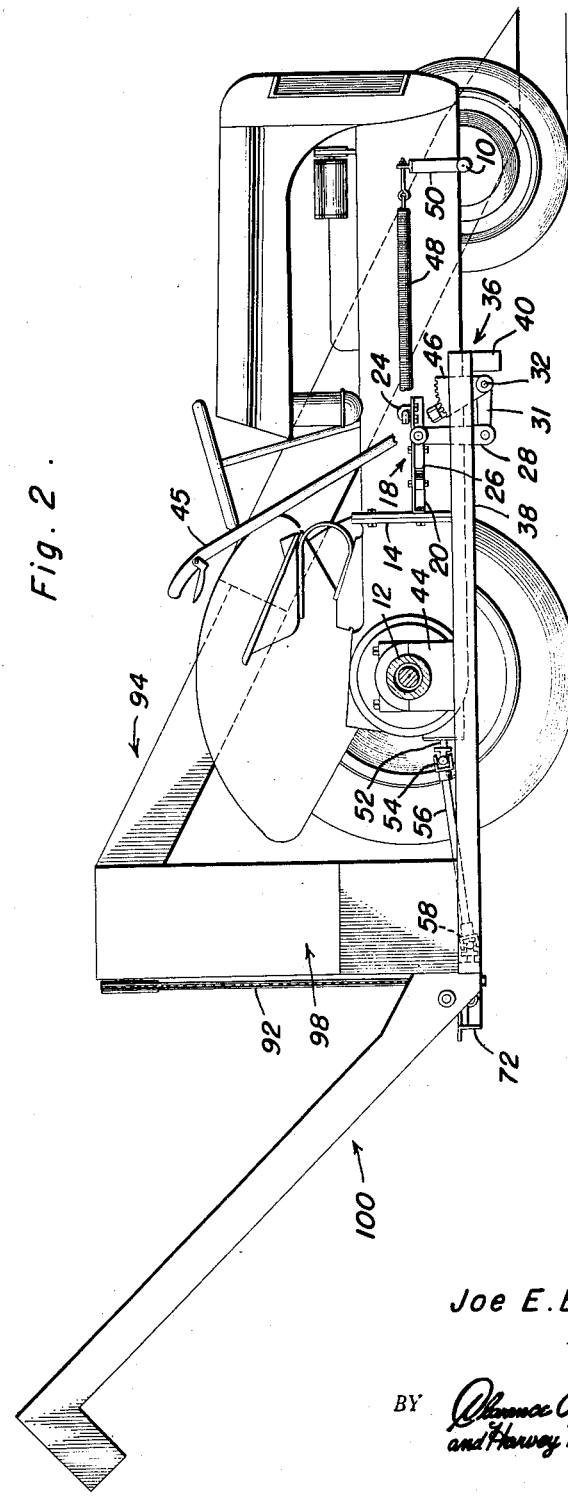
Figure 2 is a side elevational view of a tractor with a corn picker, incorporated with this invention, operatively mounted thereon, the figure being somewhat diagrammatic with respect to representation of the corn picker units.
Figure 3:
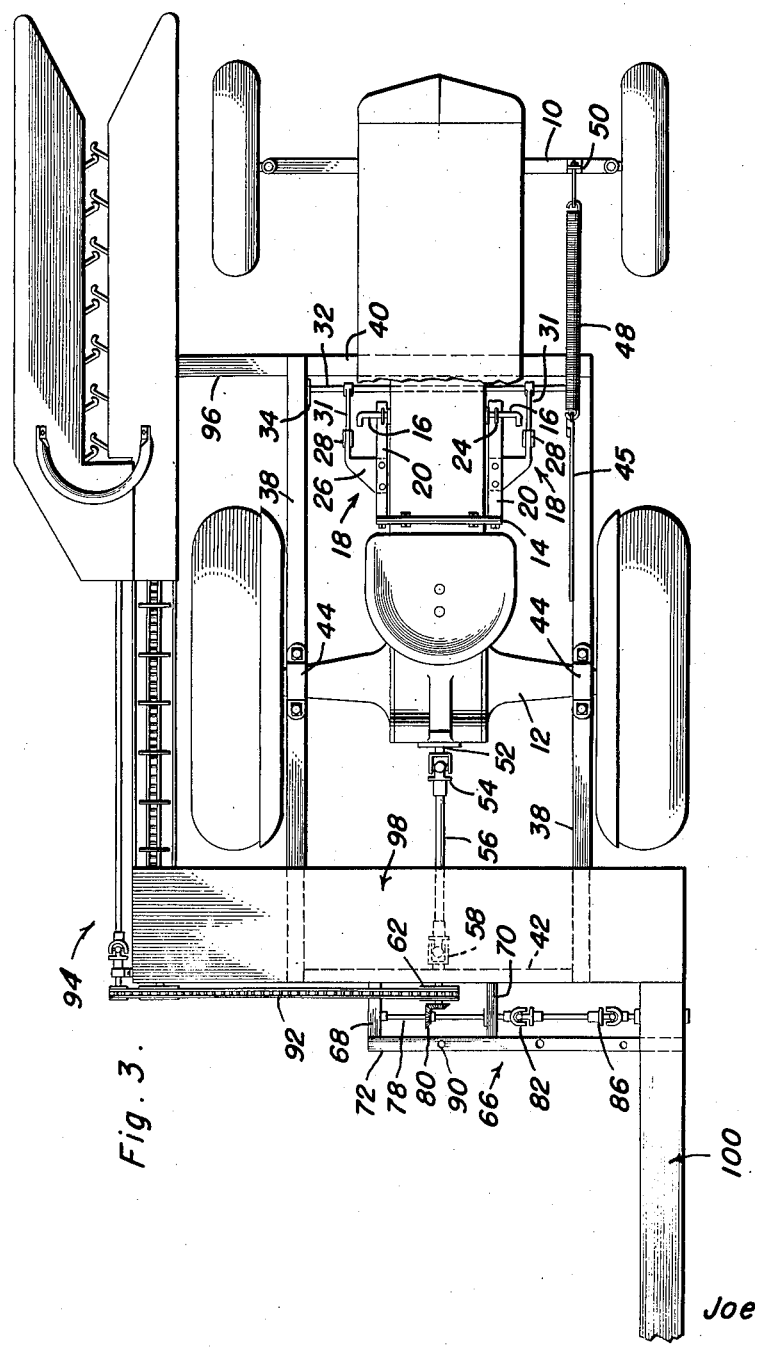
Figure 3 is a top plan view of the structure shown in Figure 2, this figure being also somewhat diagrammatic with respect to the corn picker units, and the elevator at the rear of the machine being broken away in part.

Referring now to the drawings in detail, this invention is adapted to be used with an environment including a tractor having a front axle 10, rear axle housing 12, and a vertical flange member 14 intermediate the length of the tractor, as well as step 16 or similar structure on the tractor.

A bracket, generally indicated by the numeral 18, is secured to this flange 14 on each side of the tractor, each bracket including an angle iron member 20, terminating in a bolt 22 which is used to replace one of the bolts conventionally provided in the said flange, whereby the rear ends of the brackets 18 are firmly mounted on the tractor. The front ends of the brackets 18 are secured to the said steps 16 by means of U-bolts 24 or the like. Each bracket also includes a laterally offset arm 26 to which are pivoted a pair of depending links 28, on each side of the tractor, the pivotal connection with the brackets 18 being indicated at 30. The lower ends of the links 28 are pivoted to a pair of cranks 31 fixed to a shaft 32 extending transversely of the front end portion of the frame which is generally indicated by the numeral 36. Bearings for this shaft 32 are indicated at 34 in Figure 1.

The frame 36 is generally rectangular and open and may be constructed of tubular material of square section as indicated in the drawings, or angle iron may be suitably employed in the construction of this frame. The longitudinal frame members 38 are joined at the forward end by a transverse frame member 40 and at the rear end by a transverse member 42. Bearing members 44 are secured intermediate the ends of the longitudinal frame members 38 and these bearing members 44 are adapted to be pivotally secured to the rear axle housing 12, whereby the frame 36 is adapted for rocking action about the rear axle housings. A hand lever 45 is rigidly secured at its lower end to the shaft 32 and a notched sector 46 is mounted upon the frame 36 to facilitate the securement of the handle 45 in any desired position, by the use of a conventional finger actuated pawl.

A counter-balancing spring 48 is directly secured to the lever 45 and to an upstanding bracket 50 on the front axle 10, or other suitable fixed structure on the tractor.

A power take-off shaft 52 connected to the power plant of the tractor is connected by means of a universal joint 54, a short shaft 56 and another universal joint 58, with a shaft 60 which is journaled in the transverse member 42 and extends therethrough to carry a sprocket wheel 62 and a beveled gear wheel 64.

The rear end portion of the frame 36 is provided with a sub-frame 66 which includes spaced longitudinally disposed members 68 and 70 and a transversely disposed drawbar 72 secured parallel to the transverse member 42 on the outer ends of the members 68 and 70. Bearings 74 and 76 are provided on the members 68 and 70, respectively, to support a short shaft 78 which carries a beveled gear 80, and this beveled gear drives the shaft 78 which, in turn, drives the shaft 84 through a universal joint 82. A second universal joint 86 will normally be provided to transmit power to a short drive shaft 88 used to operate an elevator generally indicated at 100, the latter being of conventional design.

A plurality of apertures 90 will be provided in the drawbar 72 which may be of angle iron, for varying the positioning of the wagon, not illustrated, which will be drawn by the tractor behind the corn picker; and the sprocket wheel 62 will be used to drive a sprocket chain 92 which transmits power for the operation of the conventional forward end portions of the corn picker, somewhat diagrammatically illustrated at 94. It will be understood that these forward end portions of the corn picker will be secured by any suitable means, depending upon the exact configuration of these forward end portions, upon the laterally extending arm 96 on the front end portion of the frame 36. The chain 92 may also be used to drive a conventional husking unit 98. Finally, the conventional elevator structure 100 will be operatively mounted upon the sub-frame 66 and driven by the short shaft 88.

The operation of this invention will be clearly understood from a consideration of the foregoing description of the mechanical details thereof, taken in connection with the drawings and the above recited objects. It will be clear that all of these objects are amply achieved by the invention and that the spring 48 will effectively counter-balance the disparity in the weight carried by the frame 36 on the forward and rear sides of the pivotal mounting thereof by the bearings 44. Actuation of the lever 45 will allow for proper positioning of the corn picker portions 94, while the elevator 100 will be mounted for independent adjustment relative to the sub-frame 66, this construction being not shown since the same is substantially conventional in many types of corn pickers. The actual construction of the husking unit 98 need not be materially changed and the portions designated by the numeral 94 will be completely unchanged in this invention.

Obviously, many minor variations in the details of construction and proportionment of the various elements of this invention may be resorted to without departure from the spirit of this invention, and the scope of the invention should be determined only in accordance with a proper interpretation of the terms used in the subjoined claims.

Having described the invention, what is claimed as new is:

1. Means for mounting a corn picker on a tractor comprising an open rectangular frame having longitudinal spaced lateral members and a front end transverse member rigidly secured to and between the lateral members and transversely spanning the tractor, rear bearings on said frame for pivotally supporting the frame on rear side portions of a tractor, adjusting means to raise and to lower the front end portion of the frame relative to said rear bearings, a laterally extending arm on the front end of said frame for support of the front end portion of a corn picker, and a sub-frame on the rear end of said frame to support a husking unit and elevator and other rear portions of a corn picker, said adjusting means comprising a shaft rotatably mounted on the front end portion of the frame, a hand lever on said shaft, a crank on said shaft, a bracket removably secured to the side of the tractor and a link pivotally connected to the crank and to said bracket.

2. Means for mounting a corn picker on a tractor comprising an open rectangular frame having longitudinal spaced lateral members and a front end transverse member rigidly secured to and between the lateral members and transversely spanning the tractor, rear bearings on said frame for pivotally supporting the frame on rear side portions of a tractor, adjusting means to raise and to lower the front end portion of the frame relative to said rear bearings, a laterally extending arm on the front end of said frame for support of the front end portion of a corn picker, a sub-frame on the rear end of said frame to support a husking unit and elevator and other rear portions of a corn picker, said adjusting means comprising a shaft rotatably mounted on the front end portion of the frame, a hand lever on said shaft, a crank on said shaft, a bracket removably secured to the side of the tractor, and a link pivotally connected to the crank and to said bracket, a counter-balancing spring connected under tension directly to and between said lever and an adjacent fixed portion of said tractor.

JOE E. BOOP.

REFERENCES CITED

The following references are of record in the file of this patent:

UNITED STATES PATENTS

| Number | Name | Date |
|---|---|---|
| Re. 21,542 | Oehler et al. | Aug. 27, 1940 |
| 1,312,432 | Burgess | Aug. 5, 1919 |
| 1,815,274 | Ronning et al. | July 21, 1931 |
| 2,287,379 | Kiehl | June 23, 1942 |
| 2,335,942 | Hyman | Dec. 7, 1943 |